United States Patent [19]

Tiner

[11] 4,012,272
[45] Mar. 15, 1977

[54] APPARATUS FOR MAKING REINFORCED FLEXIBLE HOSE

[76] Inventor: Larkin Hall Tiner, 487 Esther St., Costa Mesa, Calif. 92627

[22] Filed: Aug. 22, 1975

[21] Appl. No.: 606,869

[52] U.S. Cl. .............................. 156/429; 138/122; 156/143; 156/446; 242/47.01; 242/47.08
[51] Int. Cl.² ........................................ B65H 81/04
[58] Field of Search .......... 156/143, 144, 429, 171, 156/446; 138/122; 242/47.01, 47.08

[56] References Cited

UNITED STATES PATENTS

| | | | |
|---|---|---|---|
| 2,398,876 | 4/1946 | Bailey | 156/194 |
| 3,311,523 | 3/1967 | Carpenter et al. | 156/429 |
| 3,325,327 | 6/1967 | Swan | 156/171 |
| 3,536,559 | 10/1970 | Pelley et al. | 156/429 |
| 3,778,327 | 12/1973 | Fairchild | 156/143 |

*Primary Examiner*—Edward G. Whitby

[57] ABSTRACT

A method and apparatus for continuously forming a reinforced flexible hose is disclosed. The apparatus includes a hose-forming device including a plurality of synchronously-rotatable mandrels with a plurality of spaced apart, annular grooves therein fixedly disposed in skewed fashion relative to each other. The reinforcing element of the flexible plastic hose is formed from metal wire which is delivered tangentially into the grooves in the rotating mandrels in a sequential, progressive fashion thereby forming a helically arranged wire structure. Simultaneously with the delivery of the wire to the mandrel grooves, the longitudinal edge of the plastic ribbon which is to form the body of the hose is pre-moistened with an appropriate rapid-drying, liquid-bonding agent and then circumferentially wrapped about the wire to completely enclose it. The succeeding edge of the following tape wrap is adhesively bonded to the subsequent tape wrap. By repeating this process wrap-to-wrap, a continuous, flexible hose is formed.

3 Claims, 11 Drawing Figures

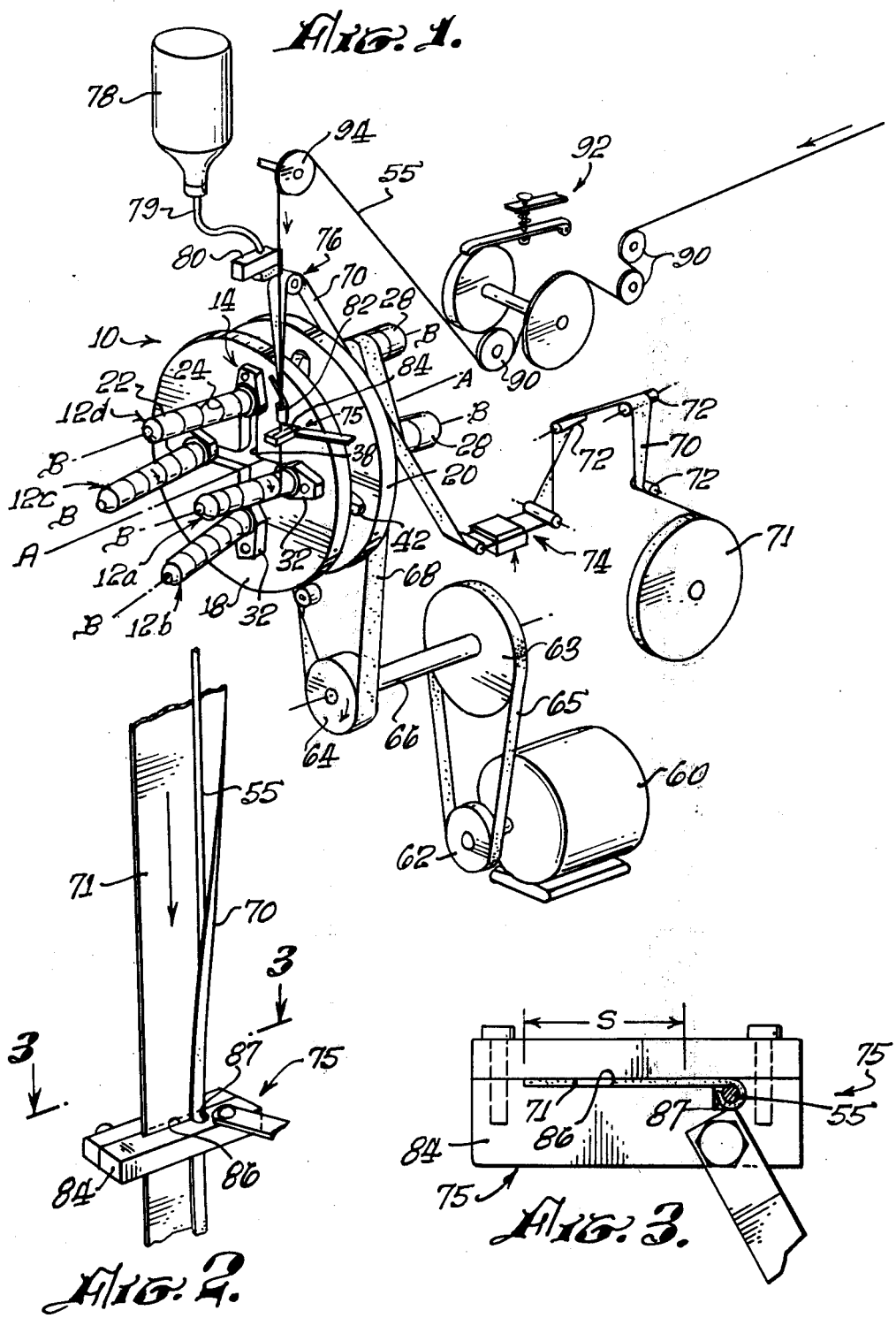

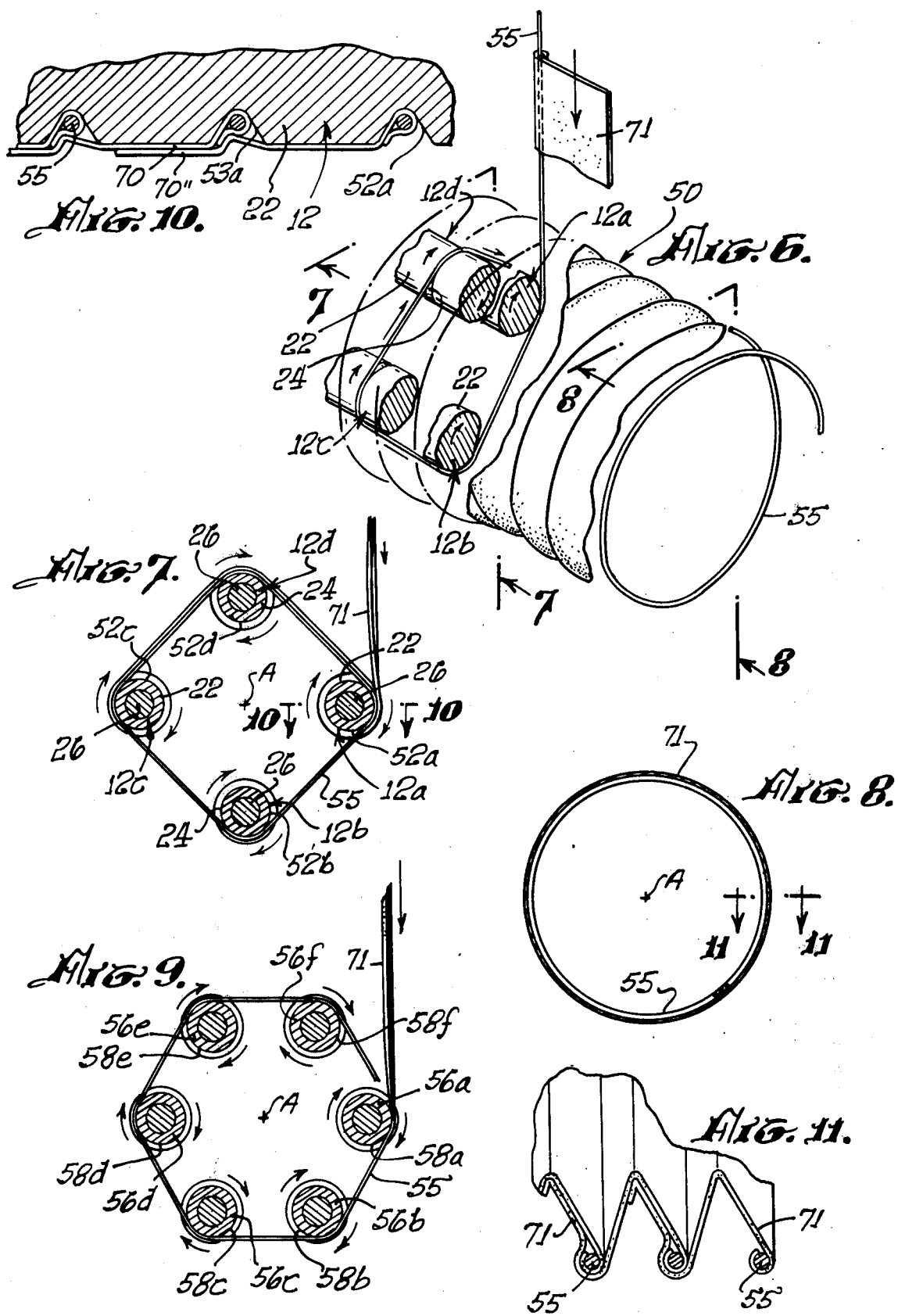

APPARATUS FOR MAKING REINFORCED FLEXIBLE HOSE

BACKGROUND OF THE INVENTION

1. Field of the Invention

This invention relates to improvements in the method and apparatus for continuously forming a flexible hose from a continuous strip of plastic ribbon pre-impregnated with a suitable liquid-bonding agent by helically winding such ribbon in an overlapping edge relation, and by incorporating a continuous, pre-formed helical wire between the overlapping edges of the helically wound ribbon.

2. Description of the Prior Art

A substantial portion of the prior art is characterized by the use of single hose-forming mandrel, such as shown and illustrated by U.S. Pat. Nos. 2,707,017 (Beare et al) and 2,731,070 (Meissner).

Beare employs a single rotating and axially traveling mandrel. In order to impart such functional characteristics to a mandrel, it is obvious that rather complex and costly machinery is necessary to accomplish this purpose. Additionally, the apparatus and method of hose manufacture as taught by Beare contemplates forming the reinforcing wire helix prior to forming the body of the hose by sequentially overlapping the tape wraps. This method is undesirable because it is very difficult to control the indexing of the helically-formed reinforcing wire as it is engaged with the tape on the mandrel.

Meissner also discloses a continuous-flexible-hose-forming method and apparatus which is characterized by the use of a single mandrel. However, Meissner envisions the use of a heated mandrel about which the tape is wrapped to form a continuous hose body. Further, the reinforcing wire element of the hose, as indicated, is pre-formed prior to engagement about the mandrel. The use of a heated mandrel and pre-formed reinforcing wire is, like in the case of Beare supra, both unnecessarily complicated and costly.

Another unique method and apparatus for continuously forming a reinforced flexible hose is disclosed in U.S. Pat. No. 3,336,172 (Hall, et al). While it appears that Hall utilizes a plurality of mandrels, each of these mandrels are stationary and do not move. Further, the method and apparatus of Hall require that the wire reinforcing element of the hose be pre-formed into a helix prior to joining it with the plastic tape which forms the hose body. Still further, the final product of the Hall apparatus as depicted in FIG. 3 is such that the tape edges are subject to separation and subsequent delamination because of the structural configuration and arrangement of the overlapping tape edges. The substantial probability of such delamination occurring is unacceptable in many applications where this type of hose is likely to be used. For example, if used as a vacuum-cleaner hose, the relatively high velocity air stream traveling over the lapped tape edges presents a shearing force which tends to produce delamination of the tape edges. In essence, the same problem is presented when the hose is used to couple the effluent discharge pipe of a recreational-vehicle, holding tank to a waste-receiving tank.

A still further device which illustrates another method and apparatus for making a hose of helically wrapped reinforcing and web components used in the prior art is the invention disclosed in U.S. Pat. No. 3,325,327 (Swan). However, it may be seen that a single mandrel is used in the apparatus disclosed in Swan. Further, the single mandrel of Swan employed a plurality of so-called "mandrel segments" which are varied during rotation of the mandrel to provide a variation in pitch of the hose components being wrapped on the mandrel. In addition, the action of these mandrel segments produces forward progression of the hose body as it is being formed, thereby moving the finished hose away from the mandrel.

It should be also noted that the reinforced hose produced by Swan's apparatus requires the use of a substantial amount of tape which is necessary to produce a plurality of laminations which is required to form the hose of Swan.

In substance, the device of Swan is complex and expensive and produces an expensive, relatively inextensible, hose product.

In order to overcome the problems and disadvantages of both the devices and methods employed in the prior art as hereinbefore described and discussed, the present invention was created.

SUMMARY OF THE INVENTION

The present invention relates to improvements in flexible-hose manufacturing—namely, an improved apparatus and method for continuously forming a flexible, reinforced hose from a continuous, flexible, adhesive tape and a continuous, spring wire. The apparatus basically includes plurality of cylindrical mandrels having a number of annular, spaced-apart grooves therein which are concentrically disposed relative to the central, longitudinal axis of said mandrel bodies; a stationary body wherein the mandrels are fixedly mounted and journaled for rotation therein, the mandrels being fixedly arranged relative to each other in a conically-skewed fashion whereby the tips of said mandrels do not contact each other: means for rotatably driving said mandrels in synchronism wherein guide means are included for directing the border of the longitudinal edge of the tape into peripheral disposition about the wire body and thereafterwards directing said tape and wire into tangential engagement with one of the mandrels, wherein afterwards said wire is progressively guided into tangential engagement with another annular groove in another mandrel disposed adjacently to the initially engaged mandrel, the other groove being located nearer to the tip of said mandrel than the first groove in said initially engaged mandrel, thereby forming a flexible, reinforced hose from a continuous length of flexible tape, and wherein the continuous length of wire is helically formed and encapsulated therein.

OBJECTS AND ADVANTAGES OF THE INVENTION

It is, therefore, a primary object of the present invention to produce a flexible, wire-reinforced hose whose construction possesses improved qualities of ruggedness and durability over the hose articles found in the prior art.

A further and equally important object of the invention is to provide an apparatus for the manufacture of a hose of the improved qualities hereinbefore mentioned.

A still further object of the invention is to provide a method for the construction of the improved hose previously disclosed.

Another object of the invention is to provide an apparatus for manufacturing a wire-reinforced hose by a continuous winding process wherein the reinforcing wire is continuously formed into a helix simultaneously with continuously winding the plastic tape into a helix, whereby the resulting hose in uniformly moved in a perdetermined, axial direction.

Still another important object of the invention is to provide an apparatus for continuously forming a prestressed, flexible hose at a rate which is more rapid than heretofore possible, thereby reducing the manufacturing cost of the hose.

It is still another object of the instant invention is to provide a hose-producing apparatus capable of producing a greater quantity of flexible hose of excellent ruggedness and durability from a lesser quantity of plastic tape than has heretofore been possible, thereby further reducing the cost of such hose manufacture.

Another important object of the subject invention is to provide a versatile apparatus of the above character capable of manufacturing continuous, flexible hose of greater flexibility and greater resiliency than it has been possible to produce with apparatus of the prior art as previously described.

Other objects of the invention will in part be obvious and will in part appear hereinafter.

The invention accordingly comprises the several steps and the relation of one or more of such steps with respect to each of the other, the apparatus embodying features of construction, combinations and arrangement of parts which are adapted to effect such steps, and the article which possesses the characteristics, properties and relation of elements, all as exemplified in the detailed disclosure hereinafter set forth. The scope of the invention will be indicated in the claims.

DESCRIPTION OF THE DRAWINGS

Referring more particularly to the accompanying drawings, which are for illustrative purposes only:

FIG. 1 is a schematic, perspective view showing the apparatus in accordance with the present invention;

FIG. 2 is an enlarged, perspective view of the tape and wire-guide means;

FIG. 3 is an enlarged view taken substantially along line 3—3 of FIG. 2;

FIG. 6 is a schematic, perspective view, illustrating the forming of the flexible hose on a group of mandrels;

FIG. 7 is a cross-sectional view taken substantially along line 7—7 of FIG. 6;

FIG. 8 is also a cross-sectional view taken substantially along line 8—8 of FIG. 6; FIG. 9 is a cross-sectional view similar to FIG. 7, showing additional mandrels mounted thereon;

FIG. 10 is an enlarged, cross-sectional view taken along line 10—10 of FIG. 7;

FIG. 11 is an enlarged, cross-sectional view taken along line 11—11 of FIG. 8.

DESCRIPTION OF THE PREFERRED EMBODIMENT

Figure 4:
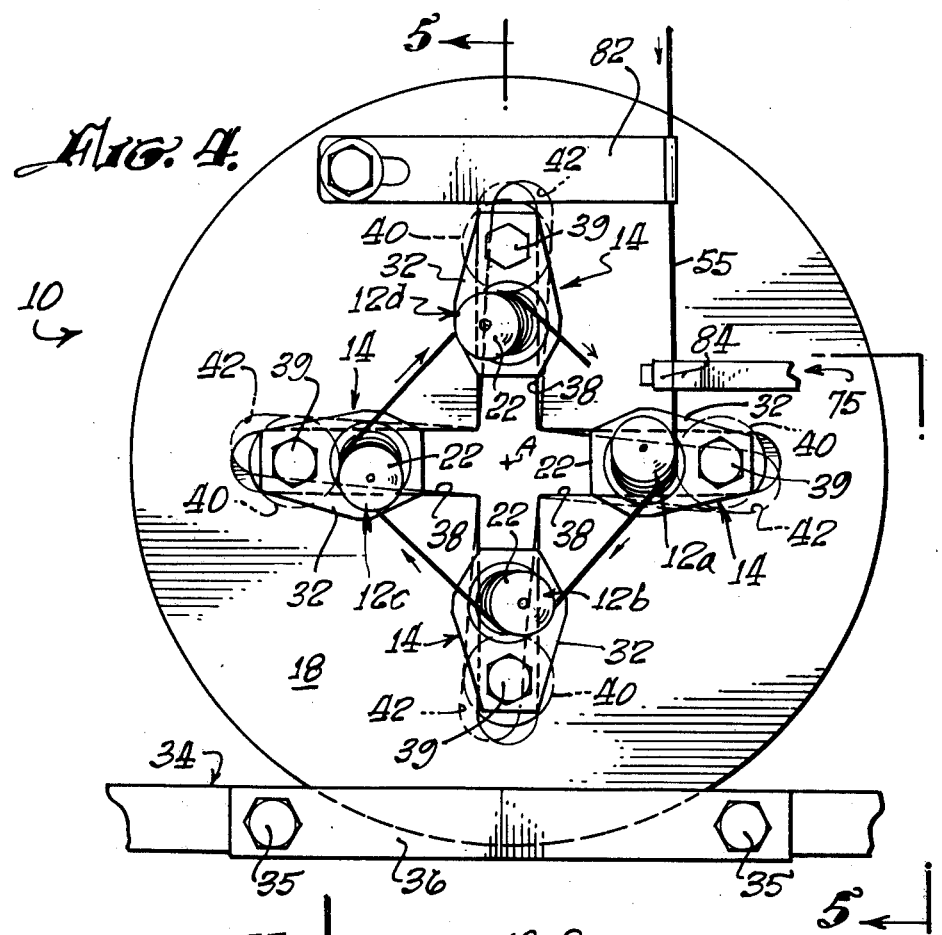
FIG. 4 is a front-elevational view of the mandrels mounted on the front-bearing, carriage plate.

Referring to the drawings, particularly with respect to the present invention as illustrated in FIG. 1, there is shown a flexible, hose-forming means, generally indicated at 10. Said hose-forming means comprises a plurality of adjustable mandrels 12a, 12b, 12c and 12d. Each mandrel is rotatably supported in a pair of floating, bearing means designated at 14 and 16, respectively. The floating, bearing means is slidably mounted to respective adjusting plates.

Accordingly, there is provided a front-bearing carriage plate 18, which defines a means for adjusting the bearings to control the diameter of the flexible hose, and a rear-bearing, carriage plate 20 which defines a means for adjusting the angle at which each mandrel will operate to provide the required pitch in forming said hose. All of these will hereinafter be described in detail.

Referring now to the detailed construction of the mandrels, the detail of one will suffice, since all are identical thereto. Thus, each mandrel includes a mandrel head 22 having a plurality of annular, spaced-apart grooves 24, which are concentrically disposed relative to the central, longitudinal axis of said mandrel body. The mandrel head 22 is secured to one end of a mandrel shaft 26, said mandrel head being positioned thereon by a set screw 27. The opposite end of each mandrel shaft 26 is provided with drive spindle pullies 28, said drive spindles being part of the means to provide a rotatable drive to said mandrels in a simultaneous, synchronized manner which will hereinafter be described.

As previously mentioned, each shaft 26 includes a pair of floating bearing means 14 and 16, respectively. Bearing means 14 comprises a fulcrum bearing 30 movably received in an adjustable bearing block 32, the block being radially adjustable within the front-bearing, carriage plate 18. Plate 18 is fixedly supported to a support structure indicated at 34, said plate being shown affixed thereto by bolts 35 passing through a support bar 36.

Accordingly, each block 32, as seen in FIG. 4, is slidably received in corresponding, radial slots 38. Thus, it is adjustable inwardly and outwardly from the central axis A—A of the plate 18, wherein the blocks are held in place by a clamping means comprising a bolt 39 and shoe nut 40. Therefore, various sized diameters can be formed with respect to the finished, flexible hose.

The second set of bearing means 16 are mounted to the rear-bearing, carriage plate 20, said bearing means being slidably supported in said plate in a similar fashion as previously described. That is, said plate 20 includes corresponding slots 42, which are disposed radially outwardly from the central, longitudinal axis "A" and are also adapted to receive bearing blocks 44, wherein said blocks include floating bearings 45 through which each respective shaft is received therethrough.

Figure 5:
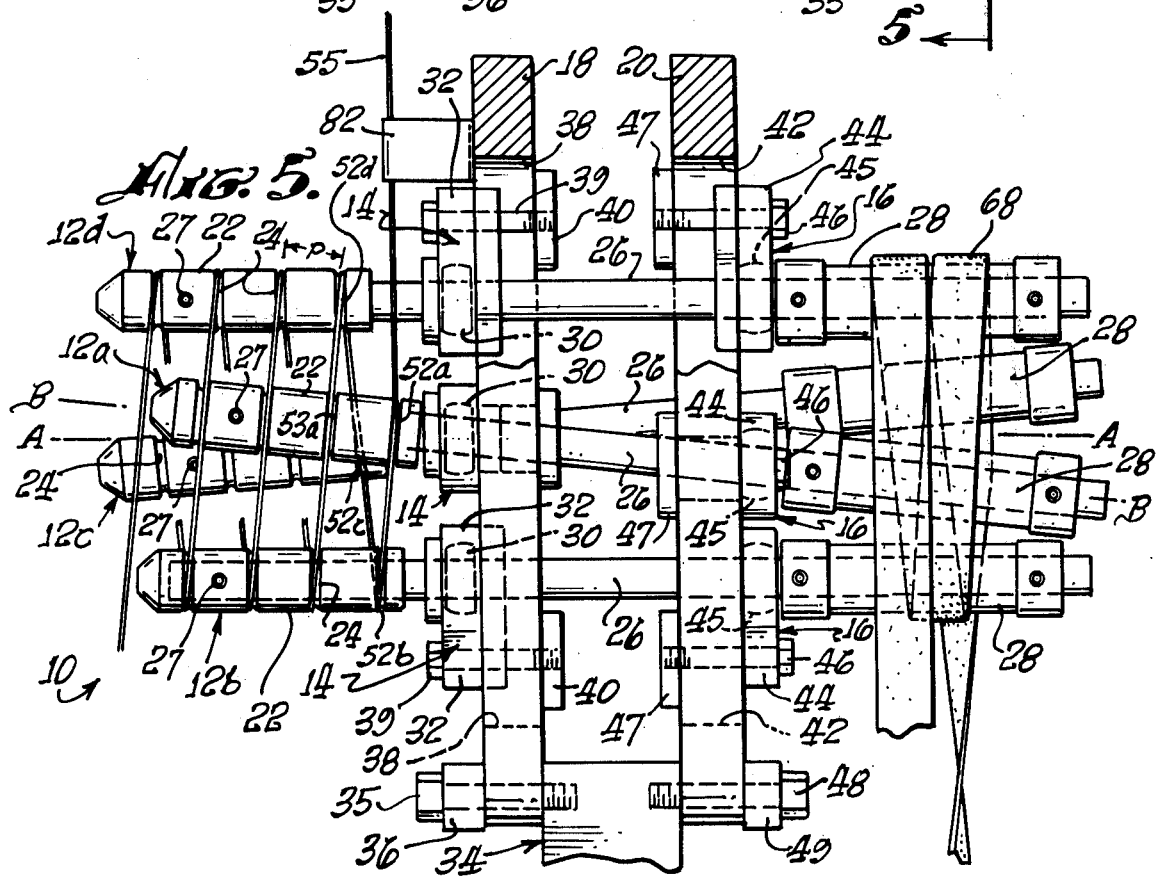
FIG. 5 is a cross-sectional view taken substantially along line 5—5 of FIG. 4.

However, it should be understood that the movement and deposition of bearings 16 provides the necessary angular position for each mandrel relative to the other, and the central axis A—A. The angular-adjusting movement of each plate is performed by the rotation of the rear carriage plate 20. This is accomplished by loosening bearing-blocks 46 and shoe nuts 47 and also bolt 48 which holds support bar 49 against plate 20, as seen in FIG. 5. Looking at FIG. 4, it can be seen that plate 20 has been rotated slightly to the right; that is, in a clockwise direction about axis A—A, thereby forcing the shaft 26 to become misaligned with axis A—A, wherein each individual axis of each mandrel 12a, 12b, 12c and 12d is then fixedly disposed in a pre-determined, skewered fashion.

Hence, it is important to note the reason for such an arrangement, that being to cause the required pitch alignment of each respective groove 24 of each mandrel head 22. The preferred embodiment as herein shown is illustrated as having four equal-spaced mandrels 12a through 12d, each having its respective grooves 24. Thus, to complete a full, continuous 360° loop of the hose with four mandrels, the grooves thereof must angularly correspond, as indicated at 50. That is, for example, if each groove on a particular group of mandrel heads is spaced apart one-half inch, such as indicated at "P" in FIG. 5, ("P" also represents the pitch) there must be a division of four grooves 52a, 52b, 52c and 52d plus 53a arranged about the axis A-A to total a one-half inch pitch within the 360°.

Therefore, starting with groove 52a of mandrel 12a, the next groove 52b of mandrel 12b is located one-eighth inch outwardly from groove 52a, and groove 52c of mandrel 12c is located one-eighth inch outwardly from groove 52b. Hence, groove 52d of mandrel 12d is also positioned one-eight of an inch from groove 52c, wherein groove 53a of mandrel 12a completes the full one-half inch pitch "P".

Accordingly, as the wire 55 is entrained about the mandrels 12a-12d and disposed in each succeeding groove, a continuous, helical loop is formed thereby having a one-half inch pitch.

At this point, it should be understood that additional numbers of mandrels can be used, depending on the type and configuration of the flexible hose to be manufactured. Additional mandrels are illustrated in FIG. 9 in which six mandrels 56a, 56b, 56c, 56d, 56e, and 56f are shown. Here again, if the grooves on each mandrel are spaced apart at a given distance to form a particular pitch, then each succeeding mandrel must be arranged to be offset one sixth the distance of the particular pitch. That is, grooves 58a through 58f are progressively offset one sixth of an inch from each other in a clockwise direction.

In order to provide the means for rotating each mandrel 12a through 12d, a drive means is arranged to engage the spindles 28. Said drive means comprises a motor 60 interconnected to spindles 28 by pullies 62, 63 and 64, wherein pully 62 drives pully 63 by belt 65, pully 63 and 64 being mounted to shaft 66, thereby rotating together. A drive belt 68 driven by pulley 64 engages spindle 28. However, it is not necessary that all spindles be directly engaged with one another—that is, various mandrels can be allowed to rotate freely with the forming of the flexible hose or tube 50.

Thus, each mandrel rotates about its own axis simultaneously in a synchronous manner with the others—that is, each mandrel rotates clockwise at an identical rpm.

Each mandel is illustrated in FIGS. 1 and 5 is having line B—B representing the axis thereof, wherein each axis B—B is skewered relative to axis A—A of plates 18. That is, each axis B—B is arranged and fixed in an oblique direction to that of axis A—A, the mandrels being positioned in a slanting direction, causing a non-parallel relationship with axis A—A. This oblique course taken by each mandrel provides two functions. The first, as previously mentioned, is to misalign the succeeding grooves on the succeeding, adjacent mandrels; and the second is to provide a means by which the flexible hose is moved outwardly for disengagement with the mandrels at a very rapid rate in a parallel plan with axis A—A.

PROCESS OF MANUFACTURE

A main object of the invention is to provide a process of manufacturing a continuously-formed, flexible hose. The following is a description thereof.

Accordingly, the flexible hose comprises a continuous plastic web or ribbon 70 which is fed to the present device from a large roll of ribbon, indicated at 71. Generally, the roll 71 will be rotatably mounted adjacent the device, wherein the ribbon 70 passes over various guide rollers, as indicated at 72 in FIG. 1.

As the ribbon is directed to the mandrels, a tension means generally indicated at 74, is provided to keep the ribbon in a taut condition as it is received in a guide means, indicated generally at 75, the guide means being more clearly shown in FIGS. 2 and 3.

Prior to entering the guide means, ribbon 70 passes through a solvent-applicator means, generally designated at 76. The applicator may be by means of any suitable type having a container 78 of bonding agent or solvent disposed therein, wherein the agent is fed by way of a tube 79 to an applicator 80, as seen in FIG. 1. The applicator 80 contacts a substantial area across the width of the ribbon, as indicated at 5 in FIG. 3.

Wire-guide means 82 is positioned between the applicator 80 and the guide means 75. It is, at this point, that the wire 55 and the ribbon come into contact with each other. The guide means 82 align the wire along one leading, longitudinal edge of ribbon 70 and moves forwardly therewith at a synchornized rate of speed, whereby said wire and said ribbon enter ribbon-guide means 75.

The ribbon-guide means comprises a split block 84 wherein an elongated slot 86 is formed having an enlarged opening 87 at one end thereof.

Accordingly, the ribbon is adapted to pass through slot 86 and is caused to circularly fold about wire 50, as seen in FIGS. 2 and 3. Hence, the longitudinal edge of the ribbon or web 70 is peripherally disposed about the wire 55, thereafter directing said web and said wire together into tangential engagement with groove 52a of mandrel 12a.

Wire 55 is continuously fed through a group of straightening wheels 90, which at the same time are provided with a wire tensioning means, generally indicated at 92. From this point, the wire is guided by roller 94 in direct alignment with wire guide means 82.

Thus, we have as mentioned, both the wire and ribbon coming together, forming a single reinforced wire web that, at this time, has the solvent agent applied thereto.

Referring to FIGS. 6, 8 and 10, it can be seen that the wired ribbon first engages mandrel 12a in groove 52a and then to mandrel 12b in groove 52b—and so until the web 70 has made a full revolution and engages in groove 53a of mandrel 12a, as particularly shown in FIG. 10.

It should be also noted at this time that web 70 begins to overlap the preceeding convoluted web section 70'. At this time, the solvent bonds web portion 70' with web porton 70", wherein the web becomes an integral, tubulor hose having a coil-like, spring wire encapsulated therein, and wherein the coils are provided with a predetermined pitch, as previously described.

As the tubular hose 50 is fed forward for disengagement with the mandrels, it will take a true circular configuration, as shown in FIG. 8. Thus, the finished product comprises a tubular hose having a helical-wrapped, reinforcing wire encased within overlies of a continuous, convoluted, flexible plastic web, wherein the webs are laminated together as an integral unit.

I claim:

1. An apparatus for continuously forming a flexible reinforced, tubular hose from a continuous, flexible plastic ribbon, and including therein a continuous spring wire, comprising, in combination:

at least four cylindrically-shaped mandrels having a mandrel head provided with a plurality of spaced-apart annular grooves disposed therein and a mandrel shaft connected at one end thereof;

a drive spindle attached to each of said shafts of said mandrels;

a first stationary carriage plate having a plurality of radially disposed slots therein to correspond to each of said mandrels, said mandrels being adjustably mounted within said slots;

a second carriage plate arranged to be rotatably adjustable, said plate having a plurality of slots radially disposed therein and arranged to adjustably receive said mandrels therein, said first and second plates being axially aligned along a central axis thereof;

means for adjusting said mandrels in said first and second plates, whereby each of said mandrels is simultaneously arranged to form a skewered, offset arrangement relative to the central axis of said plates, and whereby said grooves of each mandrel are progressively offset from the grooves of the preceding mandrel in a clockwise directon, wherein each longitudinal axis of each mandrel in arranged and fixed in an oblique direction with respect to that of said central axis of said carriage plates thereby forming a circumferential, convoluted configuration of said flexible hose, and whereby said hose is fed outwardly from said mandrel substantially along said central axis of said plates and wherein said means for adjusting said mandrels comprise:

an adjustable block member slidably received in each slot of each carriage plate;

a floating, bearing means mounted to said shafts of said mandrels and supported within each block member; and adjustable positioning means connected between said block and said plates whereby said block is located in said slots;

drive means connected to each of said mandrels whereby said mandrels are individually driven in a relatively synchronous relationship to each other;

means for rotatably adjusting said second mandrel about said central axis thereof, whereby said mandrels are simultaneously and equally adjusted to their respective positions;

guide means for guiding the border of the longitudinal, leading edge of said ribbon into peripheral disposition about the body of said wire, and thereafter directing said web and said encapsulated wire into tangential engagement with one of said mandrels, said ribbon and wire being simultaneously received in one of said annular grooves in said mandrel, wherein said ribbon and said wire are progressively guided into tangential engagement with the succeeding, adjacent mandrel having a groove offset with respect to that of the first groove of the initially engaged mandrel, said engagement being successively and sequentially repeated on each adjacent mandrel; and a bonding-agent applicator means arranged to apply a bonding agent to said ribbon prior to said ribbon engaging said mandrels, whereby said ribbon is integrally bonded to itself in a convoluted manner, thereby forming an integral, elongated, flexible hose.

2. An apparatus as recited in claim 1, wherein said drive means comprises:

a motor;

drive pullies operably interconnected to said motor and mandrels;

a drive belt operably connected said pullies to each individual spindle of said mandrels, whereby said mandrels are rotated simultaneously thereby to provide identical revolutions of each mandrel.

3. An apparatus as recited in claim 2, whereby said apparatus includes:

a ribbon-tension means positioned for direct engagement with said ribbon, whereby said ribbon is caused to be taut and substantially flat as said ribbon engages said guide means; and a wire-tension means arranged for direct engagement with said wire, whereby said wire is placed under tension prior to being encapsulated in said ribbon.

* * * * *